Oct. 22, 1963　　　　MASUMI EDA　　　3,107,580
GEAR SHAPER
Filed June 23, 1961
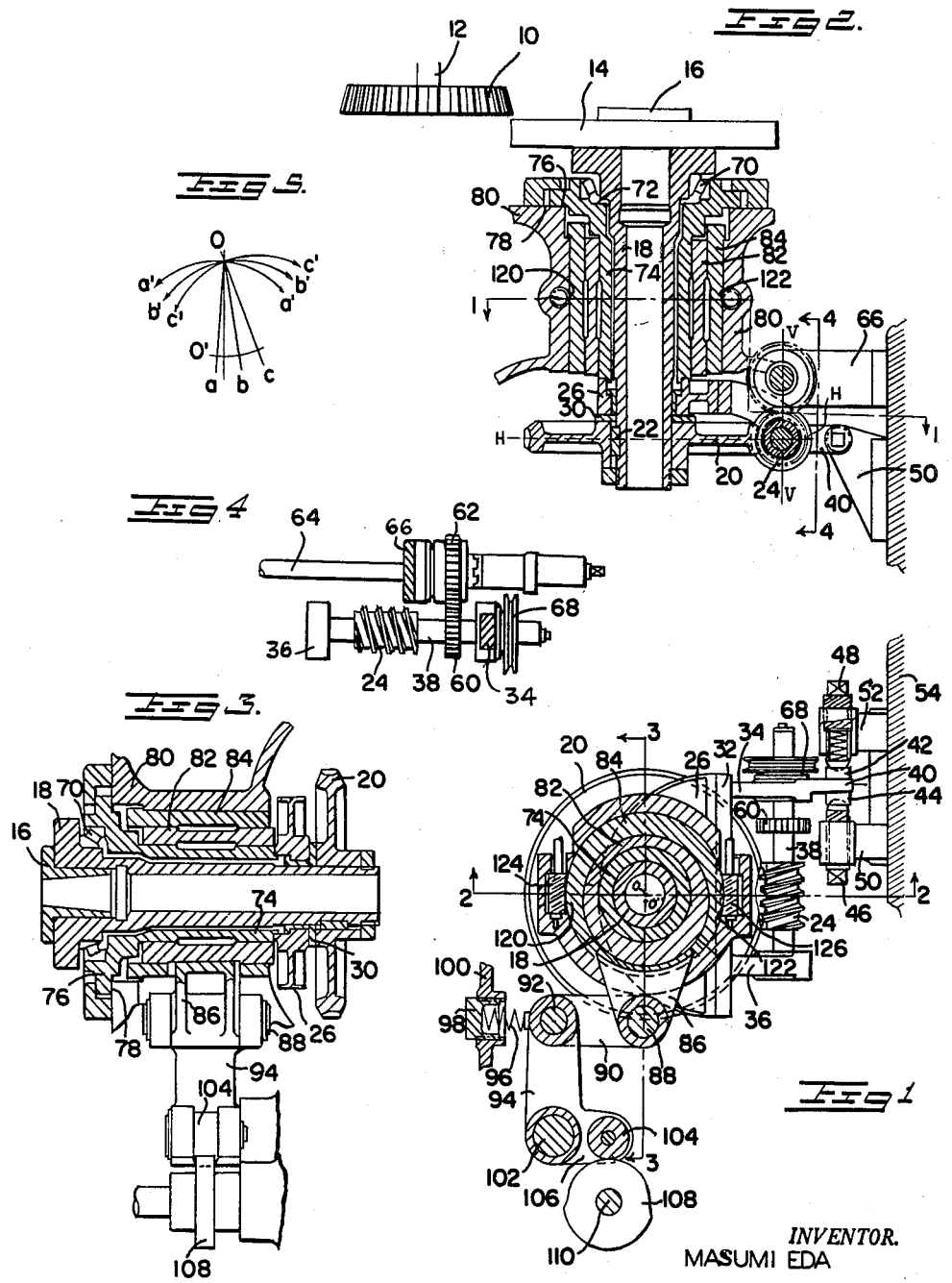
INVENTOR.
MASUMI EDA
BY James M. Drysdale
ATTORNEY United States Patent Office 3,107,580
Patented Oct. 22, 1963

3,107,580
GEAR SHAPER
Masumi Eda, No. 3 of No. 7 Denyenchof, Ota-ku, Tokyo, Japan
Filed June 23, 1961, Ser. No. 119,063
5 Claims. (Cl. 90—7)

The present invention relates to apparatus for shaping or cutting gears. The apparatus of the invention is employed for generating and cutting gear teeth by the action of a gear-like cutter on a blank or work piece. There is relative axial reciprocation between the cutter and work piece and simultaneous generative rotation of both. The cutting action is effected during movement in one direction and a separation is produced between the cutting tool and the work piece during movement in the opposite direction to prevent rubbing of the tool on the work at such times.

Heretofore, in gear shapers, provision has been made for providing this separation by a withdrawal or relieving motion between the work and cutter during the noncutting strokes of the reciprocating action, so as to avoid the aforesaid rubbing. Mechanism has been provided for moving the cutter and work toward each other for the cutting stroke wherein the cutter cuts metal from the work blank and thus forms and shapes the gear.

In prior gear shapers, when mechanism has been provided for moving the cutter away from the work for the non-cutting stroke, difficulty has been encountered because the cutter does not always travel in a straight line; but often is required to move along a spiral path. Further, mechanism has been necessary for providing a change of the working motion or the cutting stroke of the cutter to cut gears of various shapes. Thus, the operating mechanism for the cutter is frequently quite complicated. Hence, it has been difficult to build adequate mechanism for moving the cutter relatively away from the work. Therefore, mechanism has heretofore been provided for moving the work away from the cutter.

The present invention provides improved apparatus for moving the work away from the cutter during the non-cutting stroke.

Heretofore, apparatus for moving the work away from the cutter has included a rocker arm or apron lever supporting the work spindle and held between a cam and a spring. The motion of the cam is transmitted through the rocker arm or apron lever to the work spindle to produce an escape motion or backing off motion to the work. In such prior constructions, the work spindle is held in an unstable state which adversely influences the cutting pressure of the cutter against the work. Unsatisfactory cutting has resulted.

Moreover, in such prior apparatus, the gearing of worm and worm wheel which transmits the feeding motion to the work is so situated that their relative distances between each other are changed when the escape motion is given to the work spindle. Thus the drive is unstable and erratic. Consequently, the shaping of the gear proceeds irregularly, thus tending toward inaccurate gear cutting. Generally, in such prior apparatus, the direction of the escape motion is fixed and no means has been provided for changing or adjusting this direction to meet the variety and designs of gears to be shaped.

An object of this invention is to eliminate such prior defects and overcome the disadvantages of the prior apparatus.

The present invention resides in the concept of, firstly, providing an eccentric sleeve fitted around a cylindrical bearing holding a work spindle at its end. The sleeve is fitted in a cylindrical tubular bearing fixed to the machine frame. Mechanism is provided for rotating the eccentric sleeve to withdraw the work spindle, together with the work, away from the cutter during the noncutting strokes of the cutter.

Secondly, the present invention further resides in the concept of apparatus for regulating the direction of the escape or withdrawal of the work within a limited angle. In the gear cutting operation, material of the gear blank or work frequently overlaps the side of a tooth of the cutter. In order for the work to be withdrawn from the cutter, the direction of withdrawal must be regulated to accommodate the overlap. Among the other reasons for changing the direction of withdrawal of the work are: pitch and pressure angle of the cutter teeth; diameter of the gear blank; generation of internal gears instead of external gears; and reversal of the direction of rotation.

This regulation is accomplished by another eccentric sleeve surrounding the first eccentric sleeve. These two eccentric sleeves are inserted together in the cylindrical tubular bearing connected to the machine frame. The second eccentric sleeve is rotated through a desired angle by any suitable means, for example, by worm gearing connected to the sleeve. The second eccentric sleeve is rotated when regulation of the angle of escape or withdrawal is required.

The rotation of the first sleeve can be accomplished by the use of a cam and a spring mounted opposition to each other. In this arrangement, the working of the apparatus is quite stable and smooth, because the transmission is accomplished through the first eccentric sleeve which prevents undesired reversal of the motion.

The second overlapping eccentric sleeve, when actuated by worm gearing, is moved to any desired angular position. Thus the regulation can be smoothly performed when the machine is running.

Thirdly, the present invention further resides in the concept of apparatus for maintaining stable, unchanged and constant the gear transmission which provides feed motion to the work spindle. Worm gearing provides the feed motion to the work spindle. The worm is supported in a bracket member mounted on a disc fitting around the work spindle. The worm wheel is fast to the work spindle. Thus, no change can occur in the mutual or relative positions between the worm and worm wheel. Further, the driving gear for transmitting motion to the worm gearing is mounted such that the direction of transmission of driving motion is just perpendicular to that of the worm gear. Thereby, if the driving gear motion is vertical, the worm gearing as a body can be shifted horizontally without changing the relation of the gears transmitting the driving motion, to any appreciable extent, provided the amount of the displacement is small.

For a better understanding of the invention and its other objects, advantages, and details, reference is now made to the present preferred embodiment of the invention which is shown, for purposes of illustration only, in the accompanying drawings:

In the drawings:

FIG. 1 is a horizontal section taken along the broken line 1—1 in FIG. 2 and showing the parts in plan located below the section line, FIG. 2 is a vertical section taken along the line 2—2 in FIG. 1 and showing the relationship of the work and cutter, FIG. 3 is a vertical section taken along the line 3—3 in FIG. 1, and showing the work and cutter removed, FIG. 4 is a fragmentary vertical section taken along the line 4—4 in FIG. 2; and FIG. 5 is a diagram showing the direction of escape of the work spindle as well as the changes in this direction.

As seen in FIG. 2, the gear shaping apparatus includes a cutter 10 fast to a cutter spindle 12 which is reciprocated by mechanism (not shown) and rotated by other mechanism simultaneously with the work blank or gear blank 14 secured by a plug 16 to a work spindle 18.

For rotating the work spindle 18, a worm wheel 20 is fixed by key 22 to the lower end of the work spindle 18. Worm 24 is in gear with worm wheel 20. A semi-circular disc 26 has a hole therein rotatably receiving the work spindle 18. The disc 26 is supported on the worm wheel 20 by metal bearing 30. From the flat side 32 of the disc 26, two brackets 34 and 36 protrude. The brackets have aligned holes therein forming bearings for the worm shaft 38 fast to the worm 24. Thereby, the transmission of motion from worm 24 to worm wheel 20 is made in the horizontal direction along the line connecting the centers of worm 24 and worm wheel 20, that is, in the direction of the escape of the work, and forms a stable, rigid transmission gearing.

Bracket 34 has an extension 40, the outermost end of which is cupped and is adjustably held by slide pieces 42 and 44 between a screw 46 and a spring 48 both supported adjustably at the ends of brackets 50 and 52 respectively, fixed to the wall 54 of the machine. By this means, the semi-circular disc 26 is restrained or kept from rotating with the work spindle 18, and variations in the distances between the axis of the work spindle and the face of wall 54 are accommodated.

To drive the gear blank 14, rotational motion must be passed from the fixed and horizontal axis shaft 64 to the repetitively laterally movable vertical axis spindle 18. The motion transfer from the fixed to the movable element disadvantageously required a variable spacing between the axis of the mating pair of gears.

Theoretically perfect transfer of rotation from one gear to another requires constant tangency of their pitch circles, and any variation therefrom disadvantageously results in irregular gear action and excessive gear wear. The smaller the variation from tangency, the smaller are their disadvantageous results, and applicant's structure is designed to minimize the irregular gear action and wear of and on the gear. Specific structural details of applicants drive and a comparison with one old art drive are now given.

A toothed drive gear 62 is fixed on drive shaft 64 and is in gear with a toothed gear 60 located substantially directly therebelow. The gear 60 is fixed on worm shaft 38. The drive shaft 64 is supported at the ends of plural brackets 66 which brackets extend from the non-moving frame wall 54 (FIG. 1). Only one of the brackets 66 is shown in the drawings (e.g. FIG. 2) but the brackets 66 fixedly support shaft 64 so that the latter remains parallel to wall 54 throughout all movements of the spindle 18.

Spindle 18, worm wheel 20, worm 24, and shaft 38 move horizontally toward and away from the non-moving vertical wall 54 as a single unit, as brackets 36 and 34 (see FIG. 1) each extend from shaft 38 to the semicircular disc 26, and disc 26 bears (by bearing 30) around the exterior of spindle 18.

If the drive trains 62—60—24—20 were all arranged so that their pitch circles were in a straight line in a single horizontal plane as in one old art drive, then a given horizontal, or lateral, or sidewise displacement of the spindle 18 with respect to the wall 54 would result in a total equal clearance or gap or deviation from tangency between the pitch circles in the train.

In applicant's design however the gaps or clearances between the pitch circles of 62 and 60 are minimized so that the gaps are always only a small fraction of the magnitude of the horizontal lateral movement of the spindle with respect to the side wall (54 of FIG. 2), and this is accomplished by the substantially vertical alignment of (V—V of FIG. 2) shaft 64 carrying drive gear 62, and shaft 38 carrying driven gear 60; and the horizontal alignment of shaft 38 carrying drive gear 60 and the median horizontal plane of worm wheel 20.

Thus during operation, the substantially vertical alignment may exist at one initial instant, and the pitch circles of 62 and 60 are at that instant in tangential relation to give theoretically perfect driving conditions.

At a later instant the shaft 38 and gear 60 will have moved horizontally leftward or horizontally rightward an incremental amount from its initial position, and therefore the perfect tangential relationship is destroyed. The degree of imperfection of drive is proportional to the smallest distance between the pitch circles of gears 62 and 60, and is always measured on a line between the centers of gears 62 and 60.

For continued drive the magnitude of the incremental movement in the suggested old art device must be less than the radial depth of a tooth because greater increments would cause loss of physical contact between the tips of the teeth. This same small increment or horizontal movement of shaft 38 in FIG. 2 will therefore be now considered.

Assume for purposes of example only, that the pitch radii of each gear 62, 60 is 10 inches, and that the depths of the teeth are 1 inch. Then the maximum operative increment or horizontal movement would be one inch. Representing the initial and a later instant left position by a diagram we have a high right angle triangle with a horizontal base of one inch, a right exactly vertical leg of 20 inches, and a left upwardly directed hypotenuse (by the pythagorean theorem) of approximately 20.025 inches. The vertex of the acute top angle shows the constant position of the axis (end view of axis is a point) of shaft 64, the vertex of the right angle shows the initial-instant position of the axis of shaft 38, and the vertex of the left acute angle shows the later-instant position of the axis of shaft 38 after maximum incremental movement of shaft 38 and spindle 18.

Marking off the radius 10 of each gear from the extremes of the hypotenuse, we find the small distance of 0.025 inch which is the variation from tangency of pitch circles, which latter tangency gives theoretically perfect gear drive.

Since the described old art structure gives up to a full inch variation from tangency, and applicant's structure in this example gives only about 25 thousandths of an inch; it is now clear that applicant has solved the problem of lesser irregularity of action and wear of and on the gears, as his disadvantageous movement is only $\frac{1}{40}$ of the disadvantageous movement of the described prior art.

Using other physical constants (pitch diameters, tooth depth, fractional values of maximum incremental movement) and extreme movements to left and right of the vertical position of gear 60 below gear 62; will each give similar desirable small variations from tangency, and therefore better performance than the described prior art example. All of these variations are considered within the scope of applicant's claim of improved structure.

A pulley 68 is fast to the shaft 38 and this shaft may alternately be driven by a pulley of the motor shaft (not shown).

Referring to FIGS. 2 and 3, the work spindle 18 is supported by a roller bearing thrust assembly 70 seated on the shoulder 72 formed at the upper end of a bearing cylinder 74. The tubular bearing 74 has a bore formed therein receiving work spindle 18. The bearing 74 has a flange 76 supported upon a flat surface 78 formed on a portion 80 of the machine frame. Thereby, the flange 76 can be displaced a small distance in the horizontal direction, as viewed in FIG. 2.

For providing the withdrawal of the work spindle 18 and for regulating the direction of the withdrawal, a pair of eccentric sleeves 82 and 84 are fitted around the bearing cylinder 74. The inner eccentric sleeve 82 provides for the periodic withdrawal of the work spindle 18 away from cutter 10. The outer eccentric sleeve 84 provides for the regulation of the direction of this withdrawal. Outer sleeve 84 is received in a bore in frame portion 80. The inner sleeve 82 is received in the eccentric bore formed in outer sleeve 84. Similarly, tubular bearing 74 is received in an eccentric bore formed in inner sleeve 82.

The surface by which these two eccentric sleeves contact is shown as a circle having its center at point O' located a small distance from the center O of the work spindle 18.

For actuating the inner eccentric sleeve 82, a shifter arm 86 is connected to the eccentric sleeve 82 and extends therefrom. The end of shifter arm 86 is pivotally connected by pin 88 to lever 90 having its opposite end pivotally connected by pin 92 to bell crank lever 94. A compression spring 96 has one end pressing against bell crank lever 94 and its opposite end received in a cap 98 fixed to portion 100 of the machine frame. The bell crank lever 94 pivots around axle 102 and has a roller 104 pivotally mounted on its arm 106. The roller 104 is a cam follower engaging the surface of cam 108 fast to a cam shaft 110. The spring 96 pressing on bell crank lever 94 maintains the cam follower roll 104 in constant engagement with the surface of cam 108.

The cam shaft 110 is rotated at a speed to synchronize with the reciprocation of the cutter spindle 12. Hence, for each reciprocation of the cutter spindle 12, the shifter arm 86 oscillates once, giving an angular displacement to the inner eccentric sleeve 82. Let it be assumed that the outer eccentric sleeve 84 is fixed, fitting inside of the cylindrical bore in the frame portion 80, referring to FIG. 1, concentric with the work spindle 18. Further, let it be assumed that the inner eccentric sleeve 82 is displaced angularly by means of the shifter arm 86; then it will be seen that the eccentric inner sleeve 82 rotates and is guided by the inner surface of the outer eccentric sleeve 84, having its center at the point O'. Thereby, the center O of the work spindle 18 receives an oscillation along the arc having its center at O' in FIG. 1. Thus the work 14 set at the upper end of the work spindle 18 is displaced or withdrawn away from the cutter spindle 12 in the return stroke of the cutter spindle 12.

The object of providing apparatus for withdrawing the work from the cutter during the non-cutting strokes of the cutter is realized as explained above. A merit of this construction is that the work blank is held in an extremely stable condition during the cutting stroke as well as during the escaping motion and return stroke, because, by the use of an eccentric sleeve, the displacement of the work spindle 18 by the motion of the shifter arm 86 is easily accomplished. Further, the operation is further stabilized in that it is almost impossible to displace the work blank 14 and the work spindle 18 by an external force applied thereto, because of the locking action of the eccentric sleeve 82 against reverse transmission. Thus, a precise cutting of the gears can be accomplished with the work held in a stable state.

In order to provide for changing the direction of the withdrawal or escape of the work spindle, the outer eccentric sleeve 84 has worm wheel teeth cut in its periphery at segmental portions 120 and 122. These segmental portions are in gear with worms 124 and 126 which are rotatably mounted in the machine frame. When the worms 124 and 126 are turned in unison by a suitable means, as by a hand crank, not shown, the outer eccentric sleeve 84 is rotated with its periphery guided by the inner surface of the frame cylinder 80 having a center at the point O. Thereby, the center O' of the bore in outer eccentric sleeve 84 is displaced along an arc having its center located at point O, the center of work spindle 18. This displacement of the center O' is directed to the left or right as seen in FIG. 1 approximately. The center O' of the bore in the outer eccentric sleeve 84 is moved to the desired location and held there by the action of the worms 124 and 126. Thereby the direction of escape or withdrawal of the work spindle 18 is changed because it takes place around the center O'. This change of the direction of withdrawal is illustrated diagrammatically in FIG. 5 wherein point O is the center of the work spindle 18 and point O' is the center of the bore in outer eccentric sleeve 84. Assume the center O' of the eccentric, being at first point a, is moved, passing point b, to point c, by actuating worms 124 and 126. Then the direction of the escape of the work spindle will change line from a'—a', passing line b'—b', to line c'—c', in accordance with the above changes. By operation of the apparatus, the most suitable direction of escape can be given to the work spindle 18, as when the cutting of several shapes of gears is required, such as internally toothed wheels, helical gears and other gears having different pressure angles.

It will be seen that the center O' of the bore in eccentric sleeve 84 is firmly locked in position by the worm gearing 124 and 126. Thereby the work 14 is held in a stable state for highly precise cutting of the gears.

It will be seen that the transmission system is improved in that the withdrawal of the work spindle does not appreciably affect the drive of the work spindle. This has been accomplished by constructing the direction of transmission of the power to the toothed wheel 60 on the worm shaft 38 from the driving toothed wheel 62 at right angles to the direction of the gearing of the worm 24 and worm wheel 20.

While a presently preferred embodiment of the invention has been illustrated and described, it will be recognized that the invention can be variously otherwise embodied and practiced within the scope of the following claims.

I claim:

1. In a gear shaper comprising a vertical work spindle encircled by two individually rotatable and contacting vertical eccentrics and a reciprocating cutter spindle; the improvement including means for periodically withdrawing said work spindle horizontally away from said cutter spindle while maintaining the vertical positioning of the work spindle, a worm wheel fast to said spindle, a ring bearing supported by the top of the hub of the worm wheel and encircling the work spindle, a worm driving said worm wheel, means supporting said worm, said support means being carried at its inner end on said ring bearing and in running fit with said work spindle; whereby said worm and worm wheel remain in constant and unchanged engagement during all movements of the work spindle.

2. A gear shaper comprising a frame having a flat surface, said frame having a cylindrical bore formed therein and axially perpendicular to the flat surface; a tubular bearing positioned coaxial with and passing through the bore, but spaced therefrom, the bearing having an end flange resting slidably against the flat frame surface; a work spindle closely received in said tubular bearing, said work spindle being rotatably supported on said tubular bearing; an outer eccentric sleeve rotatably received in said frame bore, said outer eccentric sleeve having gear teeth formed on portions of its periphery; worms rotatably supported in said frame and meshing with said gear teeth in said outer eccentric sleeve; an inner eccentric sleeve rotatably received in said outer sleeve bore, said inner eccentric sleeve having an eccentric bore formed therein, the axis of the latter bore being coaxial with the first mentioned bore, said tubular bearing being received in and contacting said bore in said inner sleeve; a radial shifter arm connected to said inner sleeve; means for oscillating said shifter arm; a worm wheel mounted on said work spindle and fast thereto and oriented in a plane perpendicular to the length of the work spindle; a worm meshing with said worm wheel; a shaft supporting said worm; a disc supporting at one side said shaft and on an opposite side having an opening therein rotatably receiving said work spindle; a driven toothed wheel mounted on said worm shaft; a driving toothed wheel mounted at a fixed axial position on the frame and variably meshing with said driven toothed wheel, the orientation of the line of centers between said driving and driven toothed wheels varying slightly during operation to include a range each side of the vertical line which passes through the axis of the driving gear and is perpendicular to the line of centers between the worm and worm wheel.

3. Apparatus for withdrawing the work spindle from a reciprocating cutter in a gear shaper, said apparatus including a flat faced frame with a first cylindrical bore formed therein, the axis of the bore being perpendicular to the face; an outer eccentric sleeve received in the frame bore and having a cylindrical eccentric bore formed therethrough, the axis of the eccentric bore being parallel to and offset from the axis of the first bore; an inner eccentric sleeve received in the bore of the outer sleeve, and having a cylindrical eccentric bore therethrough, the axis of the latter bore being coincident with the axis of the first bore; a bearing cylinder of uniform wall thickness received in the last mentioned bore, an end portion of the bearing cylinder terminating in an outwardly extending peripheral flange bearing against the flat face of the frame; a work spindle received in and concentric with the bearing cylinder and having an expanded end portion adjacent the peripheral flange of the bearing cylinder, and a bearing thrust assembly seated between the peripheral flange of the bearing cylinder and the expanded end of the work spindle; means to angularly displace the inner eccentric sleeve in synchronism with the reciprocation of a cutter and, means for rotating the outer eccentric sleeve to change the direction of the withdrawal of said work spindle.

4. In a gear shaper including a stationary machine frame; a vertical axis cutter spindle mounted in the frame for vertical reciprocation and for rotation; a vertical axis work spindle mounted in the frame by means which prevent vertical movement but which allow rotation and horizontal movement; the mounting means including a tubular sleeve with a flared top end, the latter being in bearing contact with an overlying portion of the work spindle and an underlying portion of the frame; the mounting means also including angularly adjustable eccentric means located between the tubular sleeve and the frame.

5. A gear shaper comprising a vertical axis rotatable work spindle;
a reciprocating rotatable cutter spindle;
means for periodically moving said work spindle horizontally toward and away from said cutter spindle;
a worm wheel mounted in a horizontal plane on the lower part of said work spindle and fast thereto;
a worm meshing unvaryingly with said worm wheel;
a horizontal axis rotatable shaft supporting said worm;
bracket means supporting said shaft at spaced longitudinal locations, said bracket means also encircling with a running fit said work spindle so that the worm wheel, worm and shaft are movable horizontally as one with the work spindle;
a first power transmitting spur gear mounted fast on the said worm shaft; and a second and mating power spur gear mounted fast on a spatially fixed parallel shaft, which latter shaft is at such height that during one instant of the moving period of the work spindle, the pitch circles of the power gears are geometrically tangent and the axis of the two shafts are exactly vertically aligned thus giving theoretically perfect drive therebetween, while during other instants of the moving period of the work spindle, when the first power gear is incrementally horizontally displaced from exact vertical alignment; the pitch circles are not tangent and a variation from the theoretically perfect drive results; which variation is proportional to the magnitude of the deviation from tangency of the pitch circles as shown on a straight line between the instantaneous gear centers; and this deviation from tangency for incremental horizontal displacements up to about the radial depth of the smaller tooth of a power gear is a very small fraction of the incremental horizontal displacement, thus maintaining comparatively much better drive conditions during the period as compared to alignment of the power gears in the same horizontal plane with the said worm wheel.

References Cited in the file of this patent
UNITED STATES PATENTS

| | | |
|---|---|---|
| 2,013,557 | Fellows | Sept. 3, 1935 |
| 2,266,889 | Miller et al. | Dec. 23, 1941 |
| 2,596,343 | Miller | May 13, 1952 |